US005416166A

United States Patent [19]

Yoo et al.

[11] Patent Number: 5,416,166

[45] Date of Patent: May 16, 1995

[54] PROCESS FOR PREPARING A BINDER RESIN USEFUL IN ELECTROPHOTOGRAPHIC TONER

[75] Inventors: Jin-Nyoung Yoo; Yeong-Rae Chang; Dae-Young Kim, all of Daejeon, Rep. of Korea

[73] Assignee: Lucky Limited, Seoul, Rep. of Korea

[21] Appl. No.: 193,072

[22] PCT Filed: Jul. 21, 1992

[86] PCT No.: PCT/KR92/00033

§ 371 Date: Feb. 4, 1994

§ 102(e) Date: Feb. 4, 1994

[87] PCT Pub. No.: WO93/04407

PCT Pub. Date: Mar. 4, 1993

[30] Foreign Application Priority Data

Aug. 22, 1991 [KR] Rep. of Korea ..................... 91-14523

Mar. 13, 1992 [KR] Rep. of Korea ..................... 92-4139

[51] Int. Cl.[6] .................... C08F 267/06; C08F 267/08; C08F 6/22; G03G 9/087

[52] U.S. Cl. .................................... 525/186; 525/301; 430/109; 430/138

[58] Field of Search ................ 525/286, 301; 430/109, 430/138

[56] References Cited

U.S. PATENT DOCUMENTS 4,983,681 1/1991 Mori ..................................... 525/286

5,219,946 6/1993 Tanikawa ............................ 525/301

*Primary Examiner*—David Buttner

*Attorney, Agent, or Firm*—William F. Pinsak

[57] ABSTRACT

The present invention relates to a process for preparing a partially crosslinked binder resin useful for electrophotographic toner, which comprises:

(1) preparing a partially crosslinked polymer by way of: a non-crosslinking emulsion polymerization of an aromatic vinyl monomer, an acrylic monomer and a cyanide compound in a linear structure, and a crosslinking polymerization of an aromatic vinyl monomer, an acrylic monomer, a cyanide compound and an unsaturated carboxylic acid or an unsaturated monomer containing an epoxy group; and (2) coagulating the polymer latex obtained in step(1) in the presence of a water soluble amine.

9 Claims, No Drawings

PROCESS FOR PREPARING A BINDER RESIN USEFUL IN ELECTROPHOTOGRAPHIC TONER

FIELD OF THE INVENTION

The present invention relates to a process for preparing a binder resin useful for a dry toner which is used in the dry development of a latent electrostatic image in electrophotography. More particularly, the present invention relates to a process for preparing a resin which is partially cross-linked and has a low cross-link density and high gel content.

BACKGROUND OF THE INVENTION

Most of copy machines useful in office work employ an electrophotographic copy system. A typical mechanism of such electrophotographic system may be represented as follows: A photoconductive layer is photosensitized by being charged with a surface potential; through an exposure to light a latent electrostatic image of an original image is formed on the photoconductive layer; subsequently, a toner is charged with a potential having a charge opposite to that of the potential of the latent image; the charged toner is transferred onto the latent image and then transferred again onto a plain paper by electrostatic force, on which the toner image is fixed to provide a desired printed image.

In electrophotography, a hot roll fixing method has been generally used to fix a toner image on a plain paper. The hot roll fixing method comprises transferring a toner image from the surface of a photoconductive drum in an electrophotographic copying machine to a plain paper and fixing permanently the toner image on the paper using a hot roller at a temperature ranging from 120° to 180° C.

Toners which can be suitably used in the hot roll fixing method are required to soften at relatively low temperatures and adhere easily to the paper(to meet the fixability requirement) and not to adhere to the hot rollers even when the temperature of the hot rollers is relatively high(to have the non-offset property). The above-mentioned properties of toners are mainly dictated by the binder resins used for the preparation of the toners.

In general, if the melt viscosity of a binder resin used in a toner decreases, the fixability of the toner upon hot fixing becomes better while the non-offset property of the toner becomes deteriorated and vice versa. Therefore, many attempts have been made to develop a binder resin capable of satisfactorily meeting the above requirements for both fixability and non-offset property.

U.S. Pat. No. 4,486,524 discloses a method which comprises: producing each of a low molecular weight polymer which imparts the fixability to a toner and a high molecular weight polymer which gives the non-offset property to the toner separately; and mixing the polymers so produced. This method improves the fixability of the toner; but has the defect that the toner has poor non-offset property; and, further, a long period of time is required to produce the high molecular weight polymer, and the cost of production is high. U.S. Pat. No. 4,652,511 discloses a process for producing a resin composition which comprises suspension-polymerizing at least one vinyl monomer in aqueous medium in the presence of a dispersing agent and a high molecular weight vinyl polymer obtained by emulsion polymerization. This process requires short periods of time to produce a toner resin but the non-offset property still remains inferior.

Japanese Laid Open Patent Publication No. 134,248/1985 proposes a two-step polymerization which produces a polymer of partially cross-linked structure, that is, having both a cross-linked structure and a linear structure of low molecular weight. However, in this method, non-offset property and fixability are also liable to betray each other depending upon the cross-link density of the polymer. That is, when the cross-link density of the polymer is low, the proper gel content can not be maintained and the non-offset property of toner is poor although the fixability is adequate. On the other hand, when the cross-link density of the polymer is high, the non-offset property becomes acceptable while the toner's fixability becomes inferior.

Further, European Patent Publication No. 412,712 discloses a method which comprises: blending a low molecular weight resin containing an epoxy group and a pseudo cross-linked resin prepared by introducing an unsaturated carboxylic acid into a low molecular weight resin and attaching a multivalent metal thereto; and cross-linking the carboxylic acid with an epoxy group during a compounding process for preparing a toner, to improve-the non-offset property. However, the pseudo cross-linked resin in the form of a complex with the multivalent metal has poor heat stability during the compounding process; and, further, it is difficult to maintain a high viscosity of the pseudo cross-linked resin, which determines the ability to improve the non-offset property, and, furthermore, the efficiency of improving the non-offset property tends to be inconsistent because of the non-uniform complex formation reaction during the compounding process.

SUMMARY OF THE INVENTION

Accordingly, the object of the present invention is to provide a process for preparing a toner resin having both excellent non-offset property and fixability, which comprises: producing a polymer of a partially cross-linked structure having both a cross-linked structure with a low cross-link density and a linear low molecular weight structure; and inter-cross-linking the latex particles to produce a gel of a high molecular weight. The inter-particle cross-linking is accomplished during the coagulation process by adding a water soluble amine to the polymer latex for the ionic cross-linking of the amine to the unsaturated carboxylic acid or the covalent cross-linking of the amine to the unsaturated monomer containing an epoxy group which is incorporated in the polymer during the cross-linking step. A toner prepared from the resin of the present invention has both the excellent fixability and non-offset property.

DETAILED DESCRIPTION OF THE INVENTION

The present invention provides a process for preparing a binder resin useful for preparing an electrophotographic toner, having a partially cross-linked structure comprising both a cross-linked structure and a linear structure, which comprises:

(1) preparing a resin of a partially cross-linked polymer by way of: a non-crosslinking polymerization, which is an emulsion polymerization, of an aromatic vinyl monomer, an acrylic monomer and a cyanide compound in a linear structure; and a cross-linking polymerization, which is also an emulsion polymerization, of an aromatic vinyl monomer, an acrylic monomer, a cyanide compound and an unsaturated carboxylic acid or an unsaturated monomer containing an epoxy group; and (2) coagulating and inter-particle cross-linking the polymer latex obtained in step(1) using a water soluble amine.

Generally, polymerization of resins may be conducted by employing such conventional methods as: emulsion polymerization, suspension polymerzation, solution polymerization, bulk polymerization and the like. Of these, the emulsion polymerization method is preferred in accordance with the present invention. The novel process of the present invention comprises: a two-step polymerization: that is, a first emulsion polymerization process which polymerizes monomers in a linear structure(referred to as "non-crosslinking step") and a second emulsion polymerization which crosslinks monomers in the presence of the latex obtained in the first step(referred to as "cross-linking step"). The first and the second steps may be interchanged with each other, if desired.

In the non-crosslinking step, the monomers to be emulsion-polymerized include an aromatic vinyl monomer, an acrylic monomer and a cyanide compound. The aromatic vinyl monomer, by virtue of copolymerization with the acrylic monomer, provides a good tribo-electric property and an ability to control the fusion point of the binder resin; and the cyanide compound imparts excellent fixability to the toner together with the acrylic monomer. Such aromatic vinyl monomer may be, for example, styrene, monochlorostyrene, methylstyrene, dimethylstyrene, etc. Examples of the acrylic monomer may include acrylates such as methyl acrylate, ethyl acrylate, n-butyl acrylate, isobutyl acrylate, dodecylacrylate, 2-ethylhexyl acrylate; and methacrylates such as methyl methacrylate, ethyl methacrylate, n-butyl methacrylate. These monomers may be employed in one kind or in combination with each other, respectively. Examples of the cyanide compound may include acrylonitrile, methacrylonitrile, etc.

The aromatic vinyl monomer may be employed in the non-crosslinking step in an amount, preferably from 20 to 90%; more preferably, from 35 to 85% by weight of the total monomers employed. Also, the amount of the acrylic monomer employed may range preferably from 5 to 60% more preferably from 10 to 50% by weight; and the amount of the cyanide compound may range preferably from 5 to 50%, and, more preferably, from 10 to 50% by weight of the total monomers. If the amount of the aromatic vinyl monomer is less than 20% by weight, the pulverization of the toner prepared from the resin becomes difficult. Further, if the amount of either the acrylic monomer or the cyanide compound is less than 5% by weight, it will make the fixability of the toner poor.

In the polymerization step, a water soluble initiator may be used as a polymerization initiator. Suitable initiators may include: persulfates such as potassium persulfate and ammonium persulfate; hydrogen peroxide; redox system; and others conventionally used in emulsion polymerization. Such an initiator may preferably be used in an amount of 0.05 to 3 parts, more preferably 0.1 to 2 parts, per 100 parts by weight of the total monomers used in the non-crosslinking step.

An anionic or nonionic surfactant may be used as an emulsifier in this non-crosslinking polymerization step. Representative examples of such surfactants may include: alkyl aryl sulfonates such as sodium dodecyl benzene sulfonate and potassium dodecyl benzene sulfonate; alkyl sulfonates such as sodium dodecyl sulfonate and potassium dodecyl sulfonate; sulfates such as sodium dodecyl sulfate, sodium octyl sulfate and sodium octadecyl sulfate; salts of rosin acid such as potassium rosinate and sodium rosinate; and fatty acid salts such as potassium oleate and potassium stearate. Generally, it may be preferably used in an amount of 0.1 to 5 parts per 100 parts by weight of the total monomers used.

In addition, mercaptans such as t-dodecyl mercaptan and n-dodecyl mercaptan; terpenes such as dipentene and t-terpene; and halogenated hydrocarbons such as chloroform and carbon tetrachloride may be used as a chain transfer agent. It may be suitably used in an amount of 0.05 to 6 parts per 100 parts by weight of the total monomers used.

The non-crosslinking emulsion polymerization may be carried out at a temperature ranging from 40° C. to 95° C., preferably 60° C. to 85° C., for a period of 2 to 15 hours.

Subsequently, in the second polymerization step(-crosslinking step), in addition to the monomers used in the first step (non-crosslinking step), an unsaturated carboxylic acid or unsaturated monomer containing an epoxy group should be further used.

Representative examples of the unsaturated carboxylic acid may include acrylic acid, methacrylic aicd, itaconic acid, maleic acid, citraconic acid and fumaric acid. The suitable amount of the unsaturated carboxylic acid may range from 0.05 to 15% by weight of the total monomers used in this step. If the amount is less than 0.05%, then the non-offset property of the toner prepared therefrom becomes poor; and if the amount is greater than 15%, the fixability of the toner becomes inferior.

Examples of the unsaturated monomer containing an epoxy group may include glycidyl acrylate, glycidyl methacrylate, 4,5-epoxypentyl acrylate, 4,5-epoxypentyl methacrylate, ally glycidyl ether and butadiene monoepoxide. The suitable amount of the epoxy group-containing unsaturated monomer may range from 0.005 to 5% by weight, preferably 0.01 to 3%, of the total monomers used. If the amount of the epoxy group-containing unsaturated monomer is less than 0.05%, the effectiveness of the inter-particle crosslinking is low; and if it is greater than 5%, the melt viscosity of the polymerized material is high, and, therefore, the fixability of the toner becomes inferior.

The cross-linking step may be carried out, in the presence of a cross-linking agent, using 20 to 85%, preferably 35 to 75%, by weight of the aromatic vinyl monomer, 5 to 60%, preferably 10 to 50%, by weight of the acrylic monomer and 5 to 50%, preferably 10 to 40%, by weight of the cyanide compound.

Examples of the cross-linking agent may include: vinyl compounds such as divinylbenzene; vinyl aromatic compounds such divinyltoluene and divinylxylene; allyl compounds such as N,N-diallylmelamine; allyl vinyl compounds such as allyl acrylate; vinylidene compounds such as ethylene glycol dimethacrylate; and allyl vinylidene compounds such as allyl methacrylate. It may be suitably used in an amount of 0.001 to 4 parts, preferably 0.01 to 3 parts, per 100 parts by weight of the total monomers employed. If the amount used is less than 0.001 part, the non-offset property of the toner becomes poor; and if the amount is greater than 4 parts, the fixability of the toner becomes inferior.

The polymerization initiator and the emulsifier employed in the non-crosslinking step may also be used in the cross-linking step. The suitable amount of the initiator in this latter step may range from 0.05 to 3 parts; and the suitable amount of the emulsifier may range from 0 to 4 parts, per 100 parts by weight of the total monomers used.

The latex prepared by the above two polymerization steps is then subjected to a coagulation step. In the coagulation step, after a mixture of water and a coagulant in a reactor is stirred until the temperature reaches 60° to 80° C. the latex and an amine are then introduced thereto. The coagulant may be, for example, calcium chloride or magnesium sulfide; and employed in an amount of 2 to 4 parts per 100 parts by weight of the solid resin.

The amine employed in the coagulation step generally is a water soluble amine; and serves to form the inter-particle cross-linking between the latex particles of the resin, by reacting it with an acid or an epoxy group present in the latex particles. The water soluble amine may be, for example, ethylene diamine, diethylene triamine, triethylene tetramine, tetraethylene pentamine and isophorone diamine. The suitable amount of the water soluble amine may range from 0.01 to 5 parts, preferably from 0.05 to 3 parts, per 100 parts by weight of the solid resin. If the amount of the amine is less than 0.01 part, the inter-particle crosslinking reaction may not occur sufficiently and the toner prepared from the resin may have a poor non-offset property. Even though the amount of the amine is increased to a level greater than 3 parts, the inter-particle cross-linking reaction may not increase significantly.

The gel content of the resin represents the content of the cross-linked portion in the resin, which may be determined as follows: An appropriate amount of the resin is swelled with an organic solvent such as acetone or toluene; and centrifuged to separate the gel. The gel so separated is dried and weighed. The gel content is calculated by dividing the weight of the dried gel by the weight of the resin, as represented by the following formula:

$$\text{The gel content (\%)} = \frac{\text{The weight of the dried gel}}{\text{The weight of the resin}} \times 100$$

The suitable gel content of the resin of the present invention may range from 15 to 90% and may be controlled by adjusting the weight ratio of the resin employed in the crosslinking step to the resin employed in the non-crosslinking step. If the gel content is less than 15%, the toner finally prepared therefrom will not have a sufficient non-offset property; and if the gel content is greater than 90%, the toner may have an inferior fixability.

Further, the linear polymer prepared in accordance with the present invention may preferably have a number average molecular weight of 5,000 to 40,000, more preferably, 7,000 to 30,000; and a weight average molecular weight of 10,000 to 200,000, more preferably 20,000 to 150,000.

A toner may be prepared from the resin of the present invention by using a method known in the art. For example, in a Henschel mixer, 100 parts by weight of the resin of the present invention, 5 parts by weight of carbon black(Regal 300R, a product of Cabot corp.), 3 parts by weight of Zappon Fast Black B(a product of BASF) as a charge controlling agent and 2 parts by weight of polypropylene wax are mixed. The resulting dry powder is extruded using a twin-screw extruder; and the extrudate is cooled and finely pulverized by a jet mill to form a toner having an average particle diameter of 12 microns. A latent electrostatic image is formed by an electrophotographic copying process using GCM-8610 made by Gold Star Co., Ltd, Korea.

The properties of a toner may be evaluated by the fixability to a plain paper, the non-offset property and the quality of the image reproduced using the toner. The toner's fixability may be determined by attaching a stick tape to a part of the copied paper and then removing it therefrom. The degree of damage in the copied part of the paper is observed visually. The non-offset property of the toner may be determined by copying a blank paper after copying fifty thousand times and observing the formation of black spots on the copied paper due to the toner adhesion.

The following Examples illustrate the present invention more specifically, without limiting the scope of the invention. All units, percentage, parts, etc, as used in the Examples are by weight, unless otherwise specified.

EXAMPLE 1

A 1-l flask was charged with 200 g of water, 3 g of sodium dodecyl sulfate, 0.4 g of potassium persulfate and 3 g of t-dodecyl mercaptan, and 100 g of a monomeric mixture consisting of 80% of styrene, 15% of methyl methacrylate and 5% of acrylonitrile for non-crosslinking polymerization. The reaction mixture was polymerized at the temperature of 60° C. for 12 hours with stirring.

Into the latex so obtained were introduced 42.86 g of a monomeric mixture consisting of 78% of styrene, 10% of methyl methacrylate, 5% of acrylonitrile and 7% of acrylic acid, 0.6 g of ethylene glycol dimethacrylate, 90 g of water and 0.15 g of potassium persulfate at the temperature of 60° C. for 10 hours continuously.

300 g of the partially cross-linked latex so prepared was mixed with 3 g of tetraethylene pentamine. The resultant mixture was introduced into an aqueous calcium chloride solution at 60° C. for coagulation; and, the resulting solution was aged at 70° C. for 30 minutes. The amount of calcium chloride employed was 3 g and the resin so coagulated was filtered and dried to obtain the resin in the form of powder. The gel content of the final resin was 30%.

EXAMPLE 2

The procedures described in Example 1 were repeated except that: the monomer mixture in the non-crosslinking step consisted of 50% of styrene, 30% of butyl methacrylate and 20% of methacrylonitrile; the monomer mixture in the cross-linking step consisted of 48% of stryene, 30% of butyl methacrylate, 18% of methacrylonitrile and 4% of methacrylic acid; 0.2 part of divinylbenzene per 100 parts of the latex was used as a cross-linking agent; and as a water soluble amine, ethylene diamine was used in an amount of 0.6 part per 100 parts of the total solid resin. The weight ratio of the monomers used in the cross-linking step to the monomers used in the non-crosslinking step was 60:40. The gel content of the resulting resin was 60%.

EXAMPLE 3

The procedures described in Example 1 were repeated except that: the monomer mixture in the non-crosslinking step consisted of 25% of styrene, 20% of butyl acrylate, 15% of methyl methacrylate and 40% of methacrylonitrile; the monomer mixture in the cross-linking step consisted of 25% of styrene, 20% of butyl methacrylate, 15% of methyl methacrylate, 30% of methacrylonitrile and 10% of itaconic acid; 3 parts of butylene glycol dimethacrylate, per 100 parts of the total monomers employed in the cross-linking step was used as a cross-linking agent; and as a water soluble amine, diethylene triamine was used in an amount of 4 parts per 100 parts of the resulting solid resin. The weight ratio of the monomers used in the cross-linking step to the monomers used in the non-crosslinking step was 40:60. The gel content of the resulting resin was 40%.

EXAMPLE 4

The procedures described in Example 1 were repeated except that: the monomer mixture in the non-crosslinking step consisted of 30% of styrene, 50% of 2-ethylhexyl acrylate and 20% of acrylonitrile; the monomer mixture in the cross-linking step consisted of 30% of styrene, 49.5% of 2-ethylhexyl acrylate, 20% of acrylonitrile and 0.5% of maleic acid; 0.01 part of divinylbenzene per 100 parts of the total monomers employed in the cross-linking step was used as a cross-linking agent; and as a water soluble amine, isophorone diamine was used in an amount of 0.5 part per 100 parts of the resulting latex resin. The weight ratio of monomers used in the cross-linking step to monomers used in the non-crosslinking step was 75:25. The gel content of the resulting resin was 75%,

EXAMPLE 5

The procedures described in Example 1 were repeated except that: the monomer mixture in the non-crosslinking step consisted of 45% of methyl styrene, 40% of ethyl acrylate, 5% of methyl acrylate and 10% of acrylonitrile; the monomer mixture in the cross-linking step consisted of 45% of methyl stryene, 39% of ethyl acrylate, 5% of methyl acrylate, 10% of acrylonitrile and 1% of methacrylic acid; 0.8 part of ethylene glycol dimethacrylate per 100 parts of the total monomers employed in the cross-linking step was used as a crosslinking agent; and as a water soluble amine, triethylene tetramine was used in an amount of 0.8 part per 100 parts of the resulting solid resin. The weight ratio of monomers used in the crosslinking step to monomers used in the non-crosslinking step was 28:72. The gel content of the resulting resin was 28%.

EXAMPLE 6

A 1-l flask was charged with 200 g of water, 2 g of potassium oleate and 0.4 g of potassium persulfate; and, the resultant mixture was stirred. A monomer mixture consisting of 50 g of styrene, 19 g of butyl acrylate, 25 g of methyl methacrylate, 0.1 g of divinylbenzene as a cross-linking agent and 1 g of glycidyl methacrylate were added thereto and then reacted at the temperature of 60° C. for 10 hours with stirring.

Subsequently, to a 1-l flask was charged with 300 g of the cross-linked latex obtained above, 200 g of water and 0.5 g of potassium persulfate and the resultant mixture was stirred. A monomer mixture consisting of 50 g of styrene, 20 g of butyl acrylate, 25 g of methyl methacrylate and 3 g of carbon tetrachloride was added thereto and then reacted at the temperature of 60° C. for 5 hours.

300 g of the partially cross-linked latex(non-cross-linked resin: cross-linked resin=50:50) so prepared was mixed with 0.36 g of ethylene diamine. The resultant mixture was introduced into an aqueous calcium chloride solution at 40° C. for coagulation; and, the resulting solution was aged at 60° C. for 30 minutes. The amount of calcium chloride employed was 3 g. The resin so coagulated was filtered and dried to obtain the resin in the form of powder.

EXAMPLE 7

The procedures described in Example 6 were repeated except that the cross-linking step and the non-crosslinking step were , changed with each other.

COMPARATIVE EXAMPLE 1

The procedures described in Example 1 were repeated except that the water soluble amine was not used during the coagulation process.

COMPARATIVE EXAMPLE 2

The procedures described in Example 1 were repeated except that the composition of the monomer mixture in the cross-linking step was the same as that in the non-crosslinking step, i.e., without acrylic acid.

COMPARATIVE EXAMPLE 3

The procedures described in Example 1 were repeated except that ethylene glycol dimethacrylate as a cross-linking agent was not used.

COMPARATIVE EXAMPLE 4

The procedures described in Example 6 were repeated except that ethylene diamine was not added during the coagulation process.

COMPARATIVE EXAMPLE 5

The procedures described in Example 6 were repeated except that glycidyl methacrylate was not added during the cross-linking step.

The physical properties End performances of the toners prepared from the resins obtained in the Examples 1 to 7 and Comparative Examples 1 to 5 were evaluated and the results are shown in Table 1.

TABLE 1

| | Example 1 | Example 2 | Example 3 | Example 4 | Example 5 | Example 6 | Example 7 |
|---|---|---|---|---|---|---|---|
| Mn* | 30,000 | 25,000 | 38,000 | 10,000 | 5,000 | 28,000 | 30,000 |
| Mw** | 80,000 | 60,000 | 150,000 | 40,000 | 70,000 | 57,000 | 60,000 |
| Gel content (%) | 30 | 60 | 40 | 75 | 28 | 50 | 50 |
| Non-offset | ○ | ○ | ○ | ○ | ○ | ○ | ○ |
| Fixability | ○ | ○ | ○ | ○ | ○ | ○ | ○ |
| image density | ○ | ○ | ○ | ○ | ○ | ○ | ○ |

| | Comparative | Comparative | Comparative | Comparative | Comparative |
|---|---|---|---|---|---|

TABLE 1-continued

| | Example 1 | Example 2 | Example 3 | Example 4 | Example 5 |
|---|---|---|---|---|---|
| Mn* | 40,000 | 60,000 | 40,000 | 26,000 | 26,000 |
| Mw** | 200,000 | 180,000 | 230,000 | 80,000 | 80,000 |
| Gel content (%) | 10 | 5 | 5 | 38 | 38 |
| Non-offset | X | X | X | X | X |
| Fixability | ○ | Δ | Δ | ○ | ○ |
| image density | ○ | Δ | Δ | Δ | Δ |

○: Good Δ: usual X: Poor
*Mn represents a number average molecular weight.
**Mw represents a weight average molecular weight.

While the invention has been described in connection with the specific embodiments contained herein, it should be recognized that various modifications and changes which may be apparent to those skilled in the art to which the invention pertains may be made and also fall within the scope of the invention as defined by the claims that follow.

What is claimed is:

1. A process for preparing a binder resin which comprises:

(1) preparing a partially cross-linked polymer by way of conducting: a non-crosslinking polymerization of an aromatic vinyl monomer, an acrylic monomer and a cyanide compound; and a cross-linking polymerization of an aromatic vinyl monomer, an acrylic monomer, a cyanide compound and an unsaturated carboxylic acid or an unsaturated monomer containing an epoxy group; and, thereafter, (2) coagulating the polymer latex obtained in step(1) in the presence of a water soluble amine.

2. The process of claim I wherein the unsaturated carboxylic acid is selected from the group consisting of acrylic acid, methacrylic acid, itaconic acid, citraconic acid, fumaric acid and maleic acid.

3. The process of claim 1 wherein the unsaturated carboxylic acid is employed in an amount of 0.05 to 15% by weight of the total monomers used in the cross-linking polymerization of step(1).

4. The process of claim 1 wherein the unsaturated monomer containing an epoxy group is selected from the group consisting of glycidyl acrylate, glycidyl methacrylate, 4,5-epoxypentyl glycidyl acrylate, 4,5-epoxypentyl glycidyl methacrylate, allyl glycidyl ether and butadiene monoepoxide.

5. The process of claim i wherein the unsaturated monomer containing an epoxy group is employed in an amount of 0.005 to 5% by weight of the total monomers used in the cross-linking polymerization of step(1).

6. The process of claim 1 wherein the water soluble amine is selected from the group consisting of ethylene diamine, diethylene triamine, triethylene tetraamine, tetraethylene pentaamine and isophorone diamine.

7. The process of claim 1 wherein the water soluble amine is employed in an amount of 0.01 to 5 parts by weight per 100 parts by weight of the resin of step(1).

8. The process of claim 1 wherein the gel content of the binder resin ranges from 15% to 90% by weight.

9. The process of claim 1 wherein a cross-linking agent in an amount of 0.001 to 4 parts per 100 parts by weight of the total monomers used in the cross-linking polymerization step is employed during the cross-linking polymerization of step(1).

* * * * *